United States Patent [19]

Hamblett

[11] 4,041,616
[45] Aug. 16, 1977

[54] CIRCUIT DESIGN APPARATUS

[75] Inventor: Victor Hugh Hamblett, Worthing, England

[73] Assignee: B & G Hydraulics Limited, Worthing, England

[21] Appl. No.: 704,850

[22] Filed: July 13, 1976

[30] Foreign Application Priority Data

July 14, 1975 United Kingdom ............... 29505/75

[51] Int. Cl.$^2$ ........................................... G09B 23/06
[52] U.S. Cl. ................................... 35/19 R; 35/19 A; 35/75
[58] Field of Search ................ 35/19 R, 19 A, 27, 75, 35/53, 54

[56] References Cited

U.S. PATENT DOCUMENTS

| | | | |
|---|---|---|---|
| 1,186,146 | 6/1916 | Sutherland | 35/19 A |
| 1,286,232 | 12/1918 | Coats | 35/19 A X |
| 1,545,921 | 7/1925 | Paul | 35/19 A |
| 3,091,046 | 5/1963 | Engelstein | 35/19 A X |
| 3,406,467 | 10/1968 | Davis | 35/75 X |
| 3,505,748 | 4/1970 | Wolfe | 35/53 |

Primary Examiner—Harland S. Skogquist
Attorney, Agent, or Firm—Young & Thompson

[57] ABSTRACT

Apparatus for representing the connections between a plurality of circuit components to be connected in a circuit and a multiplicity of flow lines in the circuit comprises a first member having a multiplicity of equally spaced lines thereon to represent the flow lines in the circuit. A plurality of connection members are slidably mounted on the first member at spaced positions along the flow lines, each connection member being marked with connection indicia which are spaced apart in a direction perpendicular to the flow lines on the first member by distances equal to the spacing of the flow lines on the first member. The arrangement is such that, in use, the connection indicia and the flow lines can be viewed simultaneously. Sliding movement of the connection members relative to the first member is operable to bring different connection indicia on the connection members into register with flow lines on the first member to indicate which flow lines are required to be connected to components represented by respective connection members.

12 Claims, 20 Drawing Figures

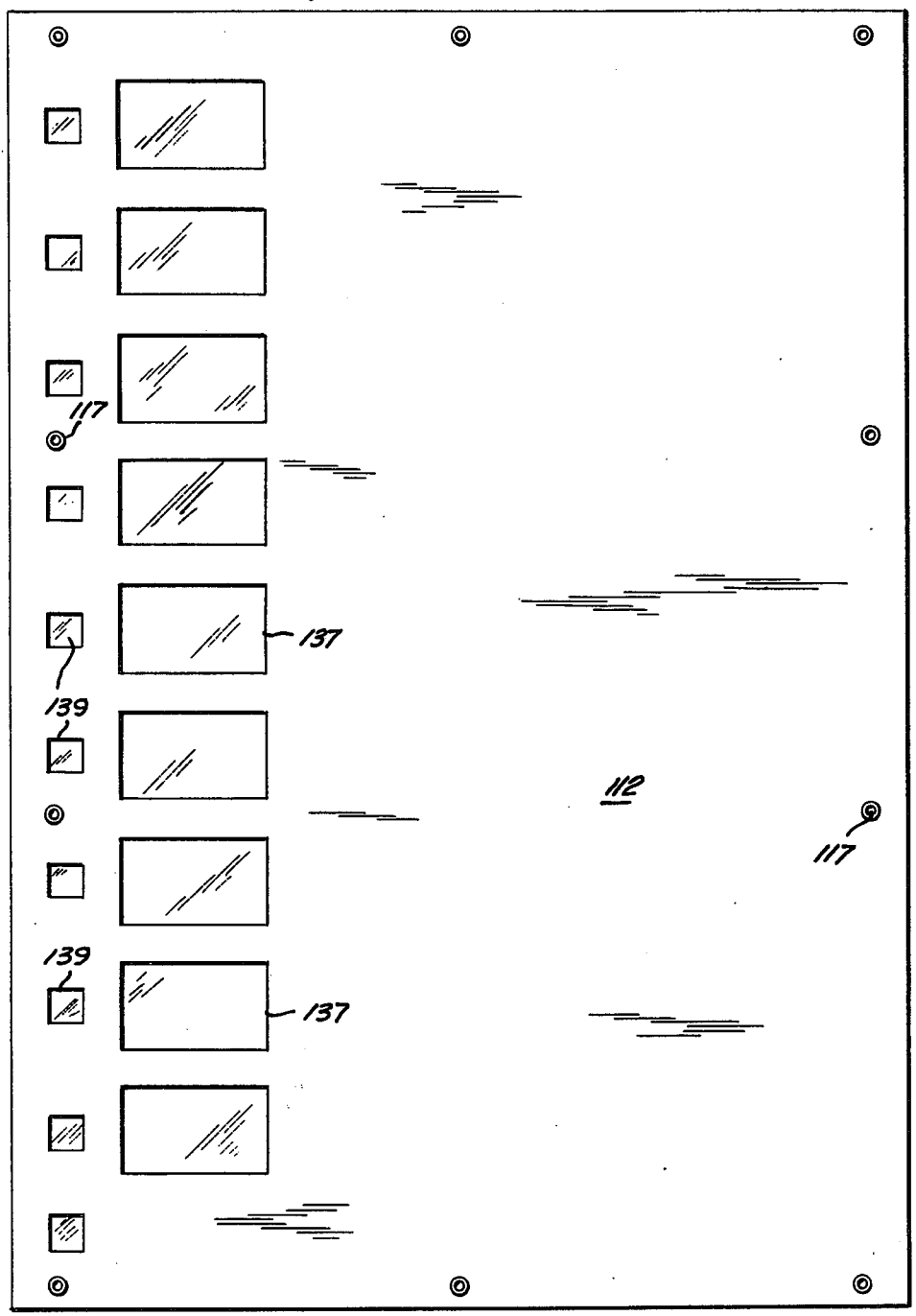

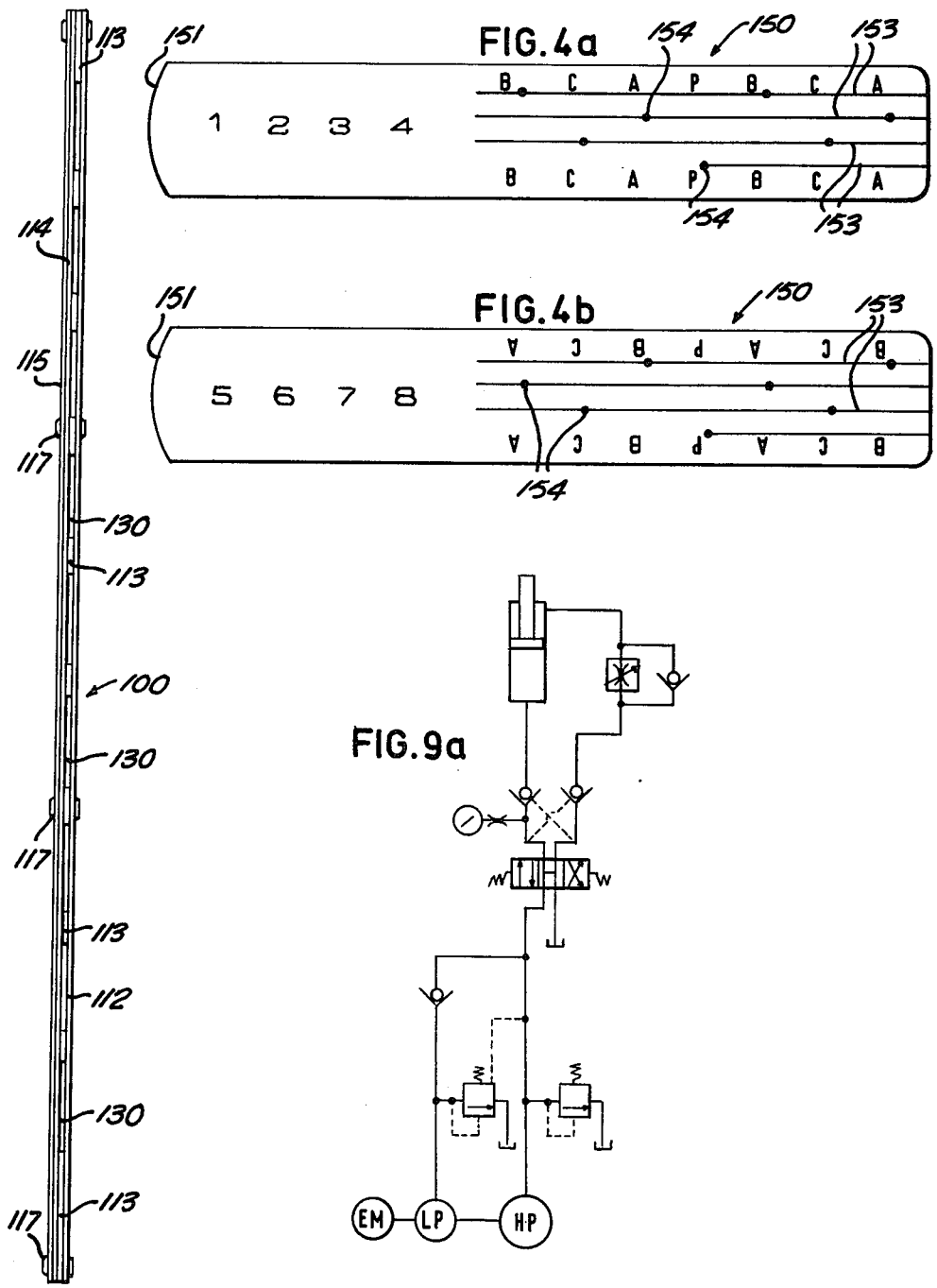

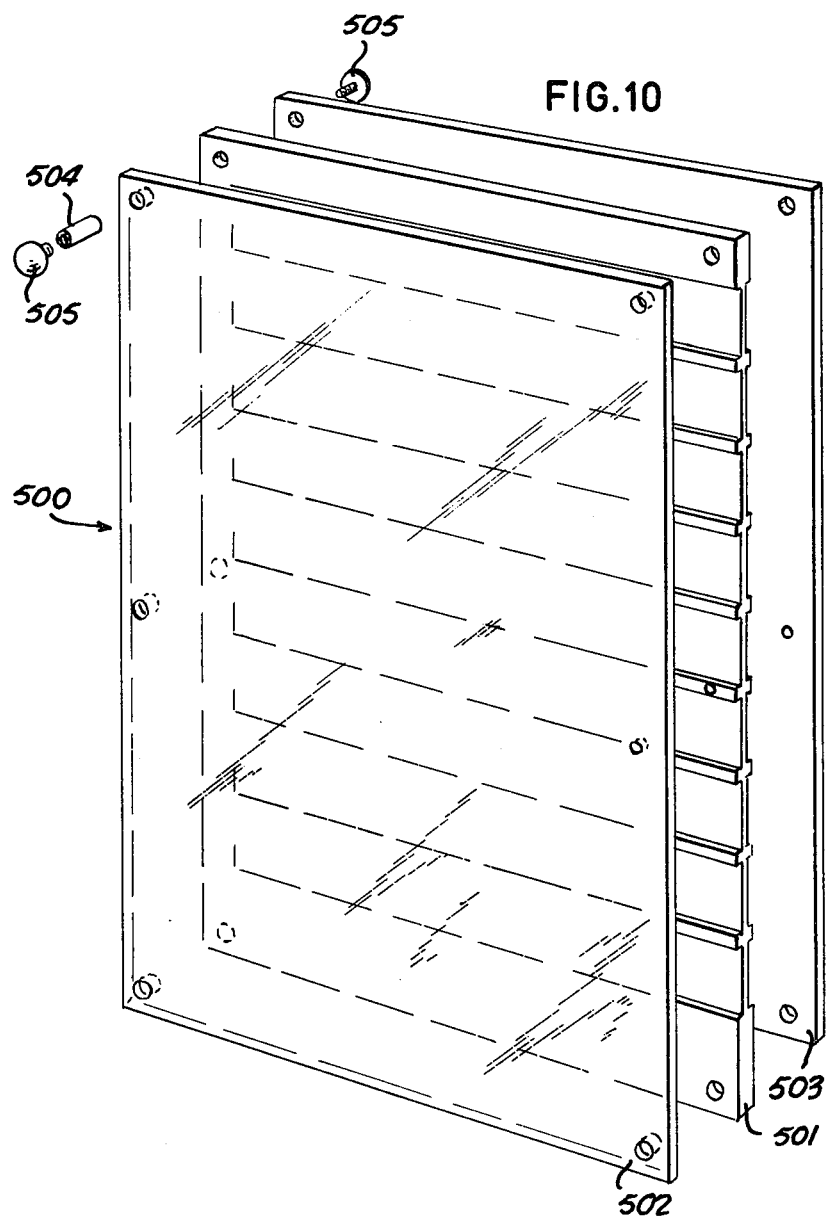

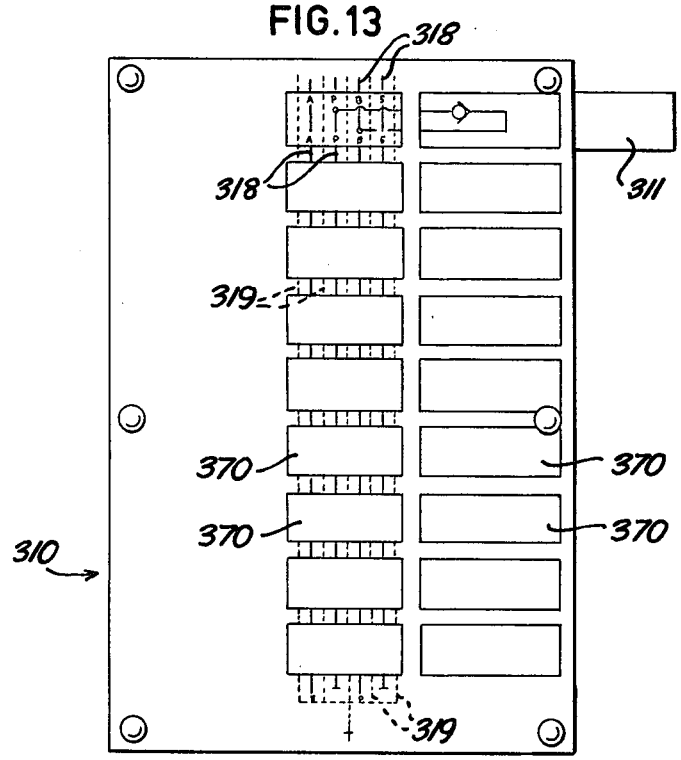
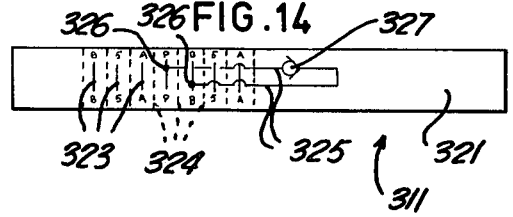

CIRCUIT DESIGN APPARATUS

The invention relates to circuit design apparatus, that is, apparatus for representing the connections of a plurality of circuit components to be connected in a circuit.

The invention provides apparatus for representing the connections between a plurality of circuit components to be connected in a circuit and a multiplicity of flow lines in the circuit, the apparatus comprising a first member having a multiplicity of equally spaced lines thereon to represent the flow lines in the circuit, and a plurality of connection members slidably mounted on the first member at spaced positions along the flow lines, each connection member being marked with connection indicia which are spaced apart in a direction perpendicular to the flow lines on the first member by distances equal to the spacing of the flow lines on the first member, the arrangement being such that, in use, the connection indicia and the flow lines can be viewed simultaneously and sliding movement of the connection members relative to the first member is operable to bring different connection indicia on the connection members into register with flow lines on the first member to indicate which flow lines are required to be connected to components represented by respective connection members.

In one embodiment, each connection member further includes a representative of a component of the circuit and is marked to indicate the connections of the component to the circuit.

In another embodiment, the apparatus further comprises a plurality of component members which are connectable to the first member, each component member being marked with a representation of a component of the circuit and an indication of its connections to the circuit.

Preferably each component member is marked with connection lines to indicate the connections of the component to the circuit, said connection lines being registerable, in use, with further connection lines which are marked on the first member and register with the connection indicia on the connection members.

Preferably the first member is a board-like member comprising a base board and a mask comprising a plurality of apertures and overlying the base board to define a plurality of channels therewith, the arrangement being such that, in use, the connection members are slidable in the channels and the connection indicia are visible through the apertures.

In this case, the mask may comprise a further plurality of apertures and the further connection lines are marked on the surface of the mask remote from the base board, the arrangement being such that the component members are slidable in the channels in the first member so that, in use, they are visible through said further apertures.

A transparent cover may be provided which overlies the mask, the flow lines being marked on the transparent cover and the connection indicia on the connection boards being visible therethrough so that, in use, the connection indicia and flow lines may be viewed simultaneously.

The circuit represented by the apparatus may be a fluid circuit, in which case the connection boards may each represent a fluid valve and the flow lines the supply and return connections to the valve.

Further features and advantages of the invention will become apparent from the following description, by way of example, of some preferred embodiments of circuit design apparatus, the description being read with reference to the accompanying drawings in which:

FIG. 2 is a plan view of the underside of the circuit board of FIG. 1;

FIG. 3 is a scrap side elevation of the circuit board showing its construction;

FIGS. 4a and 4b are respectively views of the upper and lower sides of a connection member of the circuit design apparatus;

FIG. 9a is a circuit diagram of a typical fluid circuit;

FIG. 9b is a plan view of the circuit design apparatus showing a representation of the circuit of FIG. 9a;

FIG. 10 is an exploded perspective view of a second embodiment of a circuit board;

FIG. 13 is a plan view of a third embodiment of a circuit board; and

FIG. 14 is a plan view of a component board for use with the circuit board of FIG. 13.

Figure 1:
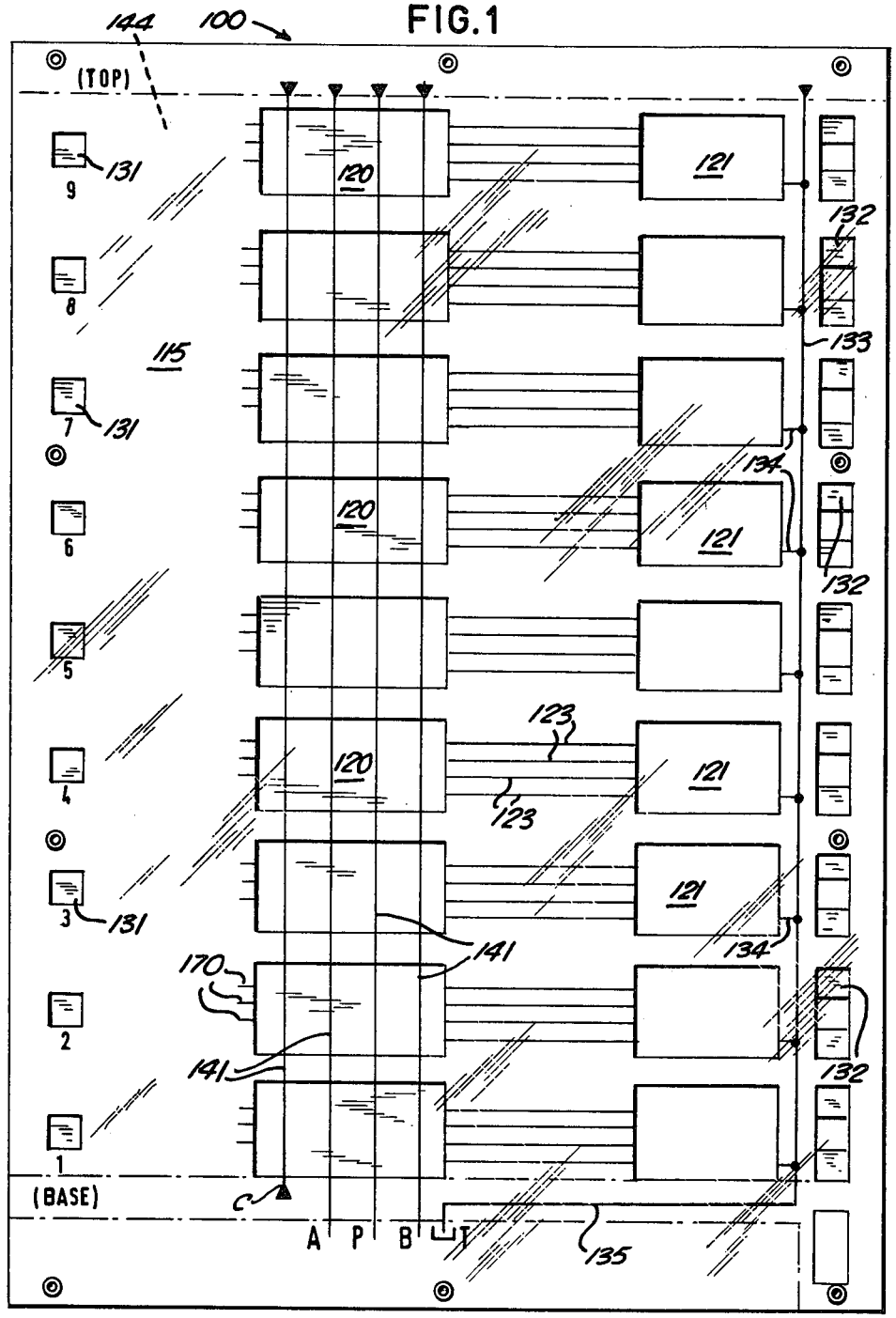
FIG. 1 is a plan view of the upper side of a first embodiment of a circuit board of a circuit design apparatus.
Figure 5A:
FIGS. 5a and 5b are respectively views of the upper and lower sides of a component member of the apparatus, representing a porting element.
Figure 5B:
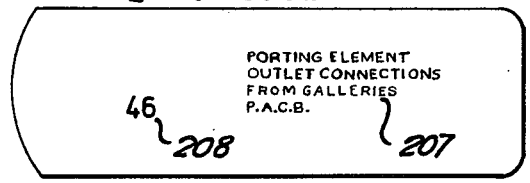
Figure 6A:
FIGS. 6 to 8 are views similar to FIG. 5 of component boards representing, respectively, a 90° change element, a check valve and a pressure reducing valve.
Figure 6B:
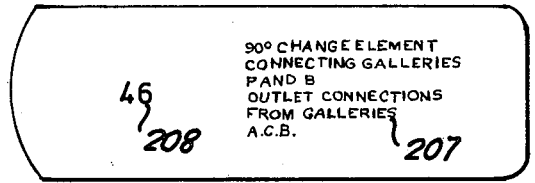
Figure 7A:
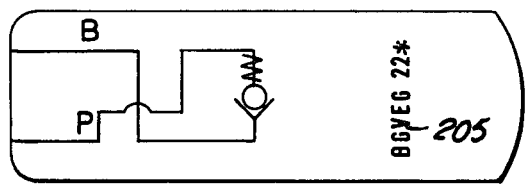
Figure 7B:
Figure 8A:
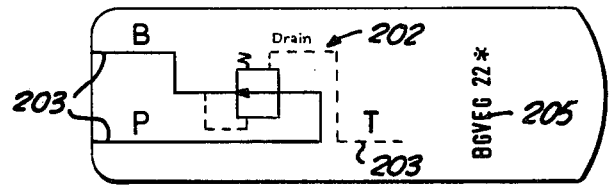
Figure 8B:
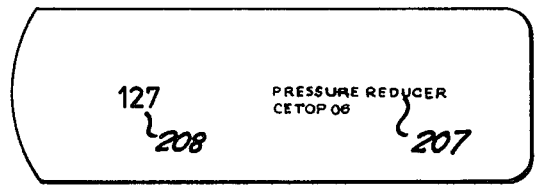

The circuit design apparatus illustrated in the drawings is intended to aid a user to design fluid power circuits, particularly circuits which are to be constructed from stackable circuit elements. Stacking valve and manifold systems are known in which each element includes a plurality of symmetrically arranged passages for the flow of fluid medium, each element being capable of several different relative orientations with an adjacent element by virtue of the symmetry of the passages. Each different relative orientation of two such elements provides a different interconnection between the elements.

Such a stacking manifold system is shown in our co-pending British patent application No. 1347/75 (and Cognate No. 999/76) in which we have described valve mounting blocks which may be stacked to form a hydraulic circuit, each of the blocks being capable of being orientated in 8 different positions with respect to an adjacent block in order to achieve the necessary interconnections with the stack of blocks. Each of the valve mounting blocks is designed to receive a particular valve on one of its faces and includes a central bore (referred to as T, the tank return bore) and four equidistantly spaced subsidiary bores arranged symmetrically around the central bore for connection with adjacent blocks.

The four subsidiary bores are respectively labelled P, the main supply bore, A for the supply to the particular device which is connected to the block, B for the return from the particular device and S or C for a spare bore.

The preferred embodiments of circuit design apparatus described below represent such valve mounting blocks and the elements mounted thereon when stacked to form a circuit. The circuit design apparatus thus provides means for simply and easily representing the elements of a fluid circuit in order to facilitate the design of such circuits.

Referring first to FIGS. 1 to 9 of the drawings, circuit design apparatus comprises a first member or circuit board 100, a plurality of connection members or boards 150 and a plurality of component members or boards 200.

The circuit board 100 (as best seen in FIGS. 1 to 3) comprises a sheet-like base member 112, a number of spacers 113, a mask 114 and a transparent cover 115. The base 112, mask 114 and cover 115 are of identical overall dimensions and overlie one another, the assembly being held together by glue and rivets 117.

The mask 114 includes two sets of rectangular apertures or windows 120, 121 arranged in two rows down the mask. Four parallel connection lines 123 join each window 120 to a respective window 121 for a purpose to be described below. The spacers 113 comprise strips of material placed between the base 112 and mask 114 and arranged to be concealed by the portions of the mask between the windows 120, 121. The spacers 113 define with the mask 114 and base 112 channels 130.

Two further rows of apertures are also provided in the mask, these being a row of small square apertures 131 to the left of windows 120 as viewed in FIG. 1 and a row of rectangular apertures 132 arranged with their longer side extending down the mask to the right of windows 121. The purpose of these further apertures will be described below.

A flow line 133 is marked on the mask 114 between the windows 121 and apertures 132. Flow line 133 represents the common tank return line T in the valve mounting blocks and includes a connection 134 to each of the windows 121 and a connection 135 to the tank marked T at the bottom of the mask.

The base 112 includes a row of apertures or windows 137 which are aligned with windows 121 and of the same size and a second row of small square apertures 139 which are aligned with apertures 132 though of rather smaller size. The base 112, spacers 113 and mask 114 are preferably all made from sheet cardboard although it will be realised that any suitable and preferably opaque material may be used.

The cover 115 is a transparent sheet preferably of acrylic material which covers the mask. Four flow lines 141, are marked on the cover 115 and represent respectively the C, A, P and B bores in the valve mounting blocks. The flow lines 141 are so positioned on the cover 115 that they each pass across each window 120.

The channels 130 in the circuit board 100 provide housings for the connection members 150 (most clearly shown in FIG. 4) and the component members (examples of which are illustrated in FIGS. 5 to 8).

Referring now to FIG. 4, each connection member 150 comprises an elongate generally rectangular cardboard member rounded at one end to provide a tab 151. Both sides of the connection member are marked with connection lines 153 and connection indicia in the form of dots 154. Furthermore one side of the connection member has numbers 1-4 marked thereon and the other side has numbers 5-8. In use, each connection member slides in one of the channels 130 in the circuit board, the member being inserted into the channel from the left hand end as viewed in FIG. 1. The markings on the connection member are so positioned that in use, the lines 153 and four of the dots 154 appear in window 120, and one of the numbers 1 to 8 appears in aperture 131. Sliding movement of the connection member is operable to bring a different number into aperture 131 and a different set of four dots into register with the flow lines 141 and four discrete positions of the connection member are obtainable in this way. By removing the member from the circuit board, inverting it and re-inserting it, four more positions are obtainable. These movements of the connection member are directly equivalent to rotation and inversion of the valve mounting block represented thereby.

Referring now particularly to FIGS. 5 to 8, each component member 200 comprises a generally rectangular cardboard member of lesser length than a connection member. The front of each component board is marked with an internationally recognized symbol 202 for the valve or other circuit element it represents and lines 203 indicating which flow lines in the circuit should be connected to that element. A part number 205 for the element is also marked on the front surface of the component member 200.

The rear surface of each component member has a description of the element it represents printed thereon (at 207) and also a number (at 208) indicating the height in millimeters of the valve mounting block on which the element represented by the component board will be mounted. The component boards are inserted into the channels 130 from the right-hand side of the circuit board as viewed in FIG. 1. When in position, the circuit symbol 202 is visible through window 121 and the element description 207 is visible through the window 137. The part number 205 appears in aperture 132 and the block height 208 appears in aperture 139. It will be realized that the block height enables the height of a valve stack represented by the apparatus to be readily ascertained.

FIGS. 5 to 8 show, by way of example, component boards representing a porting element, a 90° change element, a check valve and a pressure reducing valve. It will, of course, be realized that any other valve or other element to be included in a fluid circuit may similarly be represented.

Figure 9B:
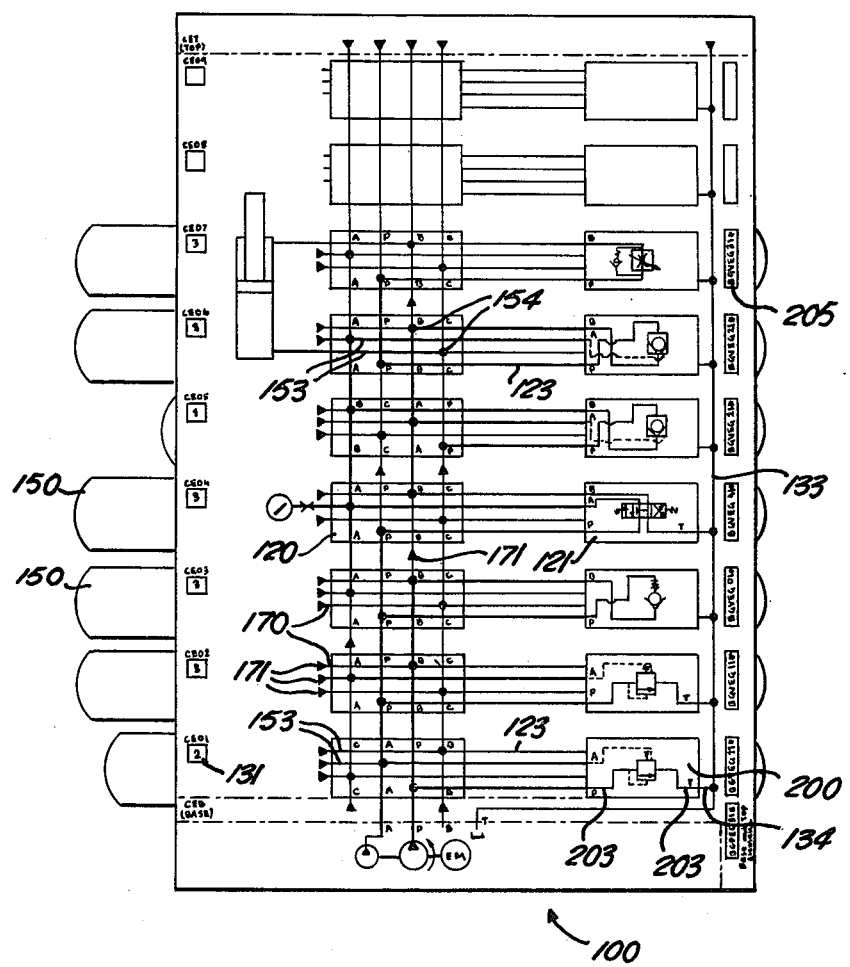
Figure 11:
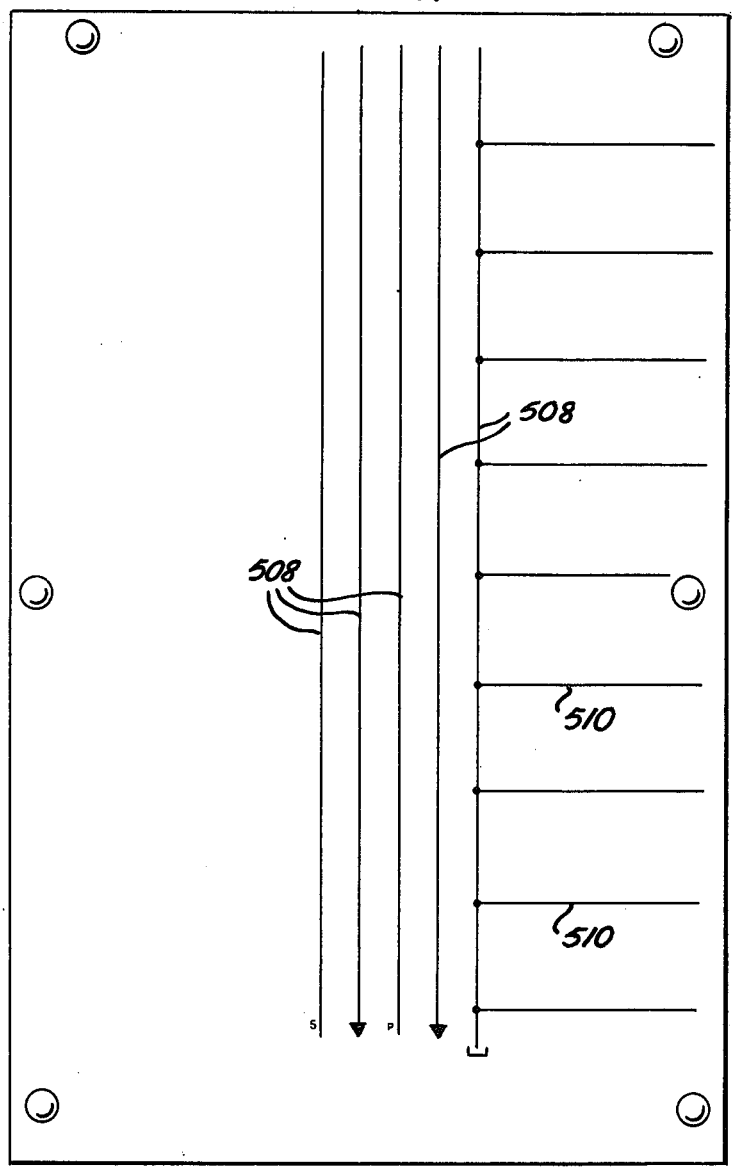
FIG. 11 is a plan view of the circuit board of FIG. 10.

The use of the circuit design apparatus is illustrated in FIGS. 9a and 9b shows a typical standard hydraulic circuit and FIG. 9b shows the same circuit represented on the circuit design apparatus. The use of the apparatus is as follows.

The circuit is first drawn as in FIG. 9a and component boards 200 representing each element of the circuit are selected, either by reference to the symbol on the front of the component board or the description on the rear. The base and top elements of the stack to be constructed are permanently marked on the face to the circuit board.

The first component board is then inserted into the lowermost channel 130 on the right hand side of the circuit board 100 and a corresponding connection board is inserted into the lowermost left hand channel. It will be observed that, when so inserted, the connection lines 153 on the connection boards 150 register with the connection lines 123 on the mask 114. Furthermore lines 203 on the component board also register with lines 123 to indicate which of the flow lines 141 are required to be connected to the component represented. It will be observed that where a component is required to be connected to tank T, the connection line 203 representing this connection registers with the corresponding connection 134 on the mask.

When the first component board 200 and connection board 150 have thus been inserted, the connection board is slidably moved into a position in which the flow line in the base chosen as inlet overlies a dot 154 which is aligned via connection lines 153 and 123 with the inlet of the element represented by the component board. The dots 154 appearing in window 120 will then indicate which flow lines are connected to the component and the number appearing in aperture 131 will indicate the rotational position of the valve mounting block represented.

A second component board 200 and connection board 150 are then inserted into the adjacent channel 130 moving up the circuit board 100 and this second connection board is slidably moved until appropriate connections are made between the adjacent components thus represented. As each component of the circuit is thus added, the circuit thus constructed may be drawn in on the transparent cover 115 with chinagraph or other suitable implement.

The side ports of the valve mounting blocks are represented by lines 170 extending from the left hand side of windows 120 and an indication of whether these are to be plugged or connected to, for example, a motor may also be drawn in on the cover 115, plugged ports being represented by marks 171.

Furthermore, where a bore, (A, B, P or S) is to be plugged between adjacent valve mounting blocks, this may also be indicated by a mark 171.

Further component and connection boards are added to the circuit board and the circuit is built up and drawn as is described above.

A completed circuit is shown in FIG. 9b, and it will be seen that for each valve mounting block represented by a connection board 150, its rotational position, part number, height, plugged ports and the description of the valve connected thereto all appear at the relevant places on the circuit board. This presentation of information enables fluid circuits constructed on the design apparatus to be written down by means of a simple coding and hence circuits may be transmitted by telex, telephone etc.

Two further embodiments of circuit design apparatus are illustrated in FIGS. 10 to 14.

In each of these further embodiments, single component boards are provided which fulfil the same purpose as the component 200 and connection boards 150 of the embodiment described above.

Referring first to FIG. 10 a circuit board 500 comprises a mask 501 sandwiched between two transparent sheets 502, 503, the three components being held together by sets of threaded dowels 504 and screws 505, only set of which is illustrated in FIG. 10. Each sheet 502, 503 is marked with five vertical equally spaced flow lines 508 (FIG. 11) representing respectively the spare C, device supply A, main supply P, device return B and main tank return T ports of valve mounting blocks such as those described in out copending application No. 13347/75.

Further lines 510 are also marked on the sheets 502, 503 for a purpose to be described later. The lines 510 are perpendicular to lines 508 and connect with the line 508 representing the tank return port. Lines 510 are spaced apart so that one line 510 is co-operable with each component board 520 in use.

The circuit board 500 is reversible, so that circuits with a relatively large number of components may be designed.

Figure 12:
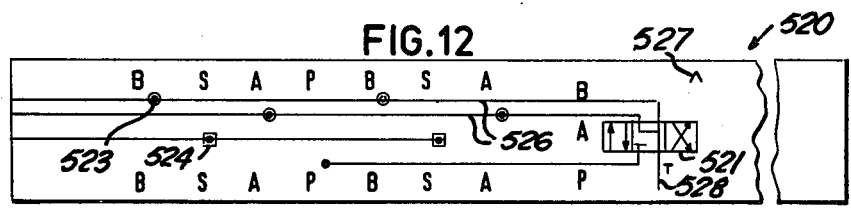
FIG. 12 is a plan view of a component board for use with the circuit board of FIG. 11.

Referring now to FIG. 12, a component board 520 is illustrated. Each such component board 520 comprises a rectangular sheet or slide marked on each face with a representation 521 of the valve or other component which the component board represents and connection indicia. Each component board thus includes the same essential information as a connection board 150 and component board 200 described above. The connection indicia on the component board represent the connections to the valve mounting block and element represented thereby and are indicated as follows:

·522 indicates the connection of a fluid supply bore to the valve interface of the block;

⊙523 indicates the connection of one of the other bores to the valve interface, the bore also being connectible to an orifice in one of the other side faces of the block; and □524 indicates the connection of a bore to an external orifice when the bore is not connected to the valve interface.

Horizontal lines 526 are drawn on the component board to indicate the connections to the valve and, except in the case of the fluid supply connections, are continued to the left hand edge of the component board as viewed in the drawings. This represents the connection of these bores to the external orifices in the valve block. Each component board is also marked with a position indicating arrow 527.

Each component board representing a valve which includes a connection to the tank return, includes a vertical line 528 representing the connection. The line 528 is of such a length that, in use, it intersects a horizontal line 510 on the circuit board to indicate the connection, Each component board is similarly marked on both sides so that the component board may be turned over to simulate all the alternative orientations of the valve mounting block which it represents.

The procedure in using this apparatus to represent circuits is similar to that described above. Each component board in turn is slid into the circuit board. The connection indicia on the component board are repeated so that sliding movement of the board 520 simulates rotation of the valve mounting block represented and are so spaced that only one set of connections appears in a window 512 formed in the circuit board at any one time. When the component board is correctly positioned, the indicia 522, 523, 524 will be aligned with the lines 508 to indicate the orientation of the valve mounting block and its connections, the line 528 (if present) will intersect line 510 to indicate the tank connection and the valve symbol 521 will be visible. A mark may be made on the transparent sheet of the circuit board to indicate the position of the component board, and ports or galleries to be plugged in and between adjacent valve mounting blocks may also be indicated by marking on the transparent sheet.

Referring now to FIGS. 13 and 14, a third embodiment of circuit design apparatus is shown. A circuit board 310 (FIG. 13) has the same construction as is depicted in FIG. 10 and the sheets 502, 503 are marked off to provide windows 370 through which component boards or slides 311 may be viewed when in position, as illustrated in FIG. 13.

The windows 370 are joined by equally-spaced flow lines 318, 319 representing the bores in the valve mounting blocks. The solid lines 318 represent the connection of adjacent ports A, B, P, S of the valve mounting blocks and the dotted lines 319 represent the connection of adjacent central bores T. The repetition of a dotted line 319 between each pair of solid lines 138 and the equal spacing of the lines 318, 319 provides a one-dimensional representation of the symmetrical two-dimensional lay-out of the bores in the valve mounting blocks.

A slide 311 (FIG. 14) comprises an elongate rectangular plate 321. Both sides of the plate 321 are marked with a series of parallel lines 323, 324 which have the same equal spacing as lines 318, 319. The solid lines 323 are a repeating series of four lines which represent the ports A, B, P, S of the valve mounting blocks and the dotted lines represent the central bore T.

The lines 323 and 324 are common to each slide 311 since each valve mounting block includes similar bores and the lines 323, 324, register in use, with lines 318, 319.

Each slide 311 is also marked with a diagrammatic representation 327 of the valve it is intended to represent and a series of lines 325 perpendicular to lines 323, 324 which show the connections of the valve to the bores. A dot 326 at the junction of a line 323, 324 and a line 325 indicates that there is a connection to that bore in the corresponding valve mounting block. The pattern of dots 326 is repeated as the pattern of lines 323 is repeated.

It is to be noted that the markings on each slide are duplicated on each side of the slide in order to represent the fact that each valve mounting block may be turned over through 180° when constructing a stack of the blocks.

The procedure for using this apparatus is similar to that described above, although in this case, connection dots 326 are aligned by registering lines 323, 318.

It will, of course, be realised that the three embodiments described above are not the limit of the invention and various modifications may be made within its scope.

For example, the circuit board and component boards may each comprise an electrical printed circuit board. In this case, by pegging at intersections of the lines on the board and switching at valves, it is possible to prove a circuit. Furthermore, by introducing resistors to indicate pressure losses and variable input current to indicate the input flow of fluid, coupled to suitable electric or electronic components, it is possible to measure and visibly indicate the efficiency of the circuit and also the speed and force of any cylinders or motors in the circuit.

I claim:
1. Apparatus for representing the connections between a plurality of circuit components to be connected in a circuit and a multiplicity of flow lines in the circuit, the apparatus comprising a first member having a multiplicity of equally spaced lines thereon to represent the flow lines in the circuit, and a plurality of connection members slidably mounted on the first member at spaced positions along the flow lines, each connection member being marked with connection indicia which are spaced apart in a direction perpendicular to the flow lines on the first member by distances equal to the spacing of the flow lines on the first member, the arrangement being such that, in use, the connection indicia and the flow lines can be viewed simultaneously and sliding movement of the connection members relative to the first member is operable to bring different connection indicia on the connection members into register with flow lines on the first member to indicate which flow lines are required to be connected to components represented by respective connection members.

2. Apparatus as claimed in claim 1 in which each connection member further includes a representation of a component of the circuit and is marked to indicate the connections of the component to the circuit.

3. Apparatus as claimed in claim 1 further comprising a plurality of component members which are connectable to the first member, each component member being marked with a representation of a component of the circuit and an indication of its connections to the circuit.

4. Apparatus as claimed in claim 3 in which each component member is marked with connection lines to indicate the connections of the component to the circuit, said connection lines being registerable, in use, with further connection lines which are marked on the first member and register with the connection indicia on the connection members.

5. Apparatus as claimed in claim 1 in which the first member is a board-like member comprising a base board and a mask comprising a plurality of apertures and over-lying the base board to define a plurality of channels therewith, the arrangement being such that, in use, the connection members are slidable in the channels and the connection indicia are visible through the apertures.

6. Apparatus as claimed in claim 5 in which each component member is marked with connection lines to indicate the connections of the component to the circuit, said connection lines being registerable, in use, with further connection lines which are marked on the first member and registering with the connection indicia on the connection members, the mask comprising a further plurality of apertures and the further connection lines being marked on the surface of the mask remote from the base board, the arrangement being such that the component members are slidable in the channels in the first member so that, in use, they are visible through said further apertures.

7. Apparatus as claimed in claim 4 further comprising a transparent cover which overlies the mask, the flow lines being marked on the transparent cover and the connection indicia on the connection boards being visible therethrough so that, in use, the connection indicia and flow lines may be viewed simultaneously.

8. Apparatus as claimed in claim 5 further comprising a transparent cover which overlies the mask, the flow lines being marked on the transparent cover and the connection indicia on the connection boards being visible therethrough so that, in use, the connection indicia and flow lines may be viewed simultaneously.

9. Apparatus as claimed in claim 1 in which there are four lines marked on the first member and each connection member is slidable through four discrete positions representing four possible connections of the component represented by the connection board to the circuit.

10. Apparatus as claimed in claim 9 in which each connection member comprises an elongate flat member marked with connection indicia on both sides, each connection member being slidable in the first member with either side uppermost so that eight possible connections may be represented.

11. Apparatus as claimed in claim 1 in which each component represented by a connection board is a fluid valve element and the flow lines represent the supply and return connections to the valve.

12. Apparatus as claimed in claim 11 further comprising a further flow line marked on the first member and representing a common return line in the circuit, the arrangement being such that each connection board which represents a valve element which is to be connected to said common return line has a connection indicium permanently in register with said further flow line during sliding movement of the connection member.

* * * * *